US006946080B2

United States Patent
Perkins et al.

(10) Patent No.: US 6,946,080 B2
(45) Date of Patent: *Sep. 20, 2005

(54) POULTRY PROCESSING WATER RECOVERY AND RE-USE PROCESS

(75) Inventors: Michael Perkins, Poquoson, VA (US); Joe Phillips, Poquoson, VA (US); Dale Gann, Ocala, FL (US); Richard Miller, Ocala, FL (US)

(73) Assignee: Zentox Corporation, Wellesley Hills, MA (US)

( * ) Notice: Subject to any disclaimer, the term of this patent is extended or adjusted under 35 U.S.C. 154(b) by 74 days.

This patent is subject to a terminal disclaimer.

(21) Appl. No.: 10/927,379

(22) Filed: Aug. 26, 2004

(65) Prior Publication Data

US 2005/0016934 A1 Jan. 27, 2005

Related U.S. Application Data

(63) Continuation of application No. 09/507,163, filed on Feb. 18, 2000, now Pat. No. 6,802,984.
(60) Provisional application No. 60/120,953, filed on Feb. 19, 1999.

(51) Int. Cl.[7] .............................. C02F 1/40; C02F 1/76; C02F 1/78; A22C 21/00
(52) U.S. Cl. ...................... 210/754; 210/745; 210/760; 210/764; 210/805; 210/806; 210/195.1; 210/259; 210/532.1; 210/800; 210/905; 210/908; 210/776; 134/10; 452/173
(58) Field of Search ................................ 210/703–707, 210/712, 719, 745, 754, 760, 764, 765, 776, 800, 805, 806, 154, 194, 195.1, 198.1, 220, 221.1, 221.2, 252, 259, 532.1, 905, 908; 134/10; 452/173

(56) References Cited

U.S. PATENT DOCUMENTS

| 3,314,880 | A | 4/1967 | Rubin | 210/44 |
|---|---|---|---|---|
| 3,350,301 | A | 10/1967 | Hoffman | 210/44 |
| 3,732,163 | A | 5/1973 | Lapidot | 210/47 |
| 3,912,533 | A | 10/1975 | Heyer | 127/13 |
| 3,945,918 | A | 3/1976 | Kirk | 210/44 |

(Continued)

FOREIGN PATENT DOCUMENTS

| EP | 0 331 296 A1 | 9/1989 |
|---|---|---|
| EP | 0 353 296 A1 | 9/1990 |
| EP | 0 468 461 A1 | 1/1992 |
| GB | 1 428 920 | 3/1976 |

OTHER PUBLICATIONS

S.A. Hamza and E. Amine, "Water Conservation and Renovation in the Poultry Processing Industry in Egypt", Water Quality Bulletin, pp. 85–88 (1982).

(Continued)

*Primary Examiner*—Robert James Popovics
(74) *Attorney, Agent, or Firm*—Mark S. Leonardo; John C. Serio; Brown Rudnick Berlack Israels LLP

(57) ABSTRACT

This invention is directed to processes designed to recover water used in certain aspects of the processing of poultry, treat the recovered water to remove solids, fats, oils and greases, animal proteins and pathogenic organisms and to reuse the treated water for poultry processing operations. Although the reuse points will vary from plant to plant depending upon specific water consumption volumes, type of processing operations conducted by the facility and regulatory requirements and approvals, there are a number of reuse points which are preferred based upon treated water quality requirements, material balances relating to the capacity to recover process streams and the consumption volumes at the identified reuse points, and source waters that have been shown to have the least total contaminant loading.

10 Claims, 4 Drawing Sheets

U.S. PATENT DOCUMENTS

| | | | |
|---|---|---|---|
| 3,951,795 A | 4/1976 | Doncer et al. | 210/61 |
| 4,021,585 A | 5/1977 | Svoboda et al. | 426/332 |
| 4,277,334 A | 7/1981 | Ruidisch et al. | 210/154 |
| 4,309,388 A | 1/1982 | Tenney et al. | 422/304 |
| 4,481,080 A | 11/1984 | Mallon | 201/31 |
| 4,517,159 A | 5/1985 | Karlson | 422/20 |
| 4,608,165 A | 8/1986 | Galper | 210/232 |
| 4,744,903 A | 5/1988 | McAninch et al. | 210/632 |
| 4,744,904 A | 5/1988 | McAninch et al. | 210/632 |
| 4,790,943 A | 12/1988 | Dunn et al. | 210/705 |
| 4,827,727 A | 5/1989 | Caracciolo | 62/63 |
| 4,844,189 A | 7/1989 | Shisgal et al. | 177/211 |
| 4,849,237 A | 7/1989 | Hurst | 426/332 |
| 4,868,950 A | 9/1989 | Harben, Jr. | 17/11.2 |
| 4,876,004 A | 10/1989 | Verhoeff | 210/170 |
| 4,947,518 A | 8/1990 | Covell, III | 17/11.2 |
| 4,966,713 A | 10/1990 | Keys et al. | 210/705 |
| 5,053,140 A | 10/1991 | Hurst | 210/704 |
| 5,132,010 A | 7/1992 | Ossenkop | 210/121 |
| 5,173,190 A | 12/1992 | Picek | 210/651 |
| 5,178,755 A | 1/1993 | LaCrosse | 210/195.1 |
| 5,227,184 A | 7/1993 | Hurst | 426/312 |
| 5,248,439 A | 9/1993 | Derrell | 210/708 |
| 5,514,282 A | 5/1996 | Hibbard et al. | 210/705 |
| 5,593,598 A | 1/1997 | McGinness et al. | 210/748 |
| 5,728,305 A | 3/1998 | Hawkinson | 210/760 |
| 5,759,415 A | 6/1998 | Adams | 210/776 |
| 5,882,253 A | 3/1999 | Mostoller | 452/173 |
| 6,802,984 B1 * | 10/2004 | Perkins et al. | 210/754 |
| 2003/0094422 A1 * | 5/2003 | Perkins et al. | 210/764 |

OTHER PUBLICATIONS

A. L. Waldroup, "Summary of Work to Control Pathogens in Poultry Processing", Journal of Poultry Science, vol. 72, pp. 1177–1179, (1993).

S.A. Hamza and Jack Witherow, "Potential for Water Reuse in Egyptian Poultry Processing", Journal of Food Science, pp. 1153–1157, 1161, (1978).

"Preozonation as a Coagulant Aid in Drinking Water Treatment", Saunier, Selleck and Trussell, Journal AWWA, May 1983, pp. 239–246.

"Ozone as a Coagulant Aid", Reckhow, Singer, Trussell, AWWA Seminar Proceedings No. 20005, 1986, pp. 17–46.

* cited by examiner

POULTRY PROCESSING WATER RECOVERY AND RE-USE PROCESS

CROSS REFERENCE TO RELATED APPLICATIONS

This application is a continuation application of U.S. Ser. No. 09/507,163, filed on Feb. 18, 2000, now U.S. Pat. No. 6,802,984, which claims benefit from U.S. provisional application Ser. No. 60/120,953 filed on Feb. 19, 1999, both of which are incorporated herein by reference in their entirety.

BACKGROUND

1. Technical Field

The present disclosure relates generally to the field of carcass processing, and more particularly, is directed to a water disinfection, recovery and re-use process used in the processing of poultry.

2. Background of the Related Art

The typical poultry processing plant receives live animals from the grow-out farms, slaughters the animals, drains the blood and then removes the feathers, "paws", heads and detritus in the initial stages of processing. The carcasses are then sent to mechanized evisceration where the internal organs, digestive tract and other edible and inedible parts are removed. In typical operations, some of the internal organs (i.e., heart, liver and gizzards) are harvested for food products. The carcasses are thereafter sent by way of mechanized line operations through a series of washing and sanitizing steps before the product is shipped as "fresh" product or packaged for freezing. These line operations typically consume large quantities of water.

Accordingly, the poultry processing industry has generally been characterized as a large volume consumer of water in conducting the slaughter, processing and packing of animals for both human consumption and other uses. Recent initiatives by the United States Department of Agriculture (USDA), under the jurisdiction of the Food Safety Inspection Service (FSIS), have resulted in a further increase in the volume of water used to wash poultry carcasses to meet the more stringent requirements of "0 pathogen tolerance".

In addition, poultry industry interests have been actively seeking methods of reducing the consumption of water due to economic reasons and, additionally in some cases, because of limited availability of sufficient volumes of water to meet the processing requirements. Still other considerations involving limited water treatment resources have raised the need to reduce water consumption. It is therefore an object of the present invention to provide new solutions to reducing the volume of water required for processing poultry or other foodstuffs.

Prior processes have not focused on the need to conserve water from an economic perspective and accordingly, while they may generally involve water reuse applications, their approaches have failed to address critical economic restrictions inherent in poultry and other food processing operations. It is yet another object of the present invention to provide water reuse processes which are economically feasible and which provide improved savings to the food-preparing manufacturer.

Typical of prior approaches have been efforts directed to the recovery, treatment and recycle of poultry chiller bath water in a closed loop and "semi-closed loop" type of process where water from the chiller baths is treated to remove solids, fats, oil, grease, organic compounds and microorganisms before reintroducing the treated water to the chiller baths. These efforts may be characterized as primarily aimed at reducing the electrical power considerations in chilling the water used in these systems of processing operations. These goals are generally met by reusing the already cooled chiller water and trying to reintroduce the already chilled water back into the chiller makeup feed water, thereby reducing the temperature of incoming fresh water. However, the recovery of used chiller bath process water brings with it a very high contamination burden requiring extensive treatment. Representative examples of such approaches have been described in U.S. Pat. Nos. 5,728,305; 5,173,190; 5,178,755; 5,053,140; 4,790,943; and 5,593,598. While such approaches have had some limited success in addressing the treatment challenges, they have to date proven to be of questionable economic value to the industry. It is still another object of the present invention to address such deficiencies with new approaches and devices, which are economically sensitive.

Prior efforts have also generated a substantial number of devices designed to provide some filtering efforts. U.S. Pat. Nos. 5,759,415; 5,248,439; 5,132,010; 4,876,004; 4,844,189; 4,481,080 and 3,912,533 provide representative examples of such devices. As will be readily noted, some are structurally complex requiring substantial capital expenses and others, while simpler in structure, are aimed at solving different needs. For example, U.S. Pat. No. 4,481,080 shows a series of printouts separated by baffles for equalizing the residence times of large and small particles. It has been discovered that such solutions are either unnecessarily complex or are unnecessary altogether. It is another aspect of the present invention to provide devices useful in water recovery and treatment methods, which avoid such deficiencies and solve the needs of removing gross levels of contaminants quickly, effectively and economically.

In several of the inventions referenced the inventors have directed their efforts at chilled water reuse claiming significant savings in Btu requirements. The devices employed have focused upon the recovery, treatment and reuse of the USDA required 0.5 gallon per bird overflow. While the technical approaches may differ from invention to invention, they share the disadvantages that the source of their water (i.e., bird chiller water) contains a significant and high quantity of organic contaminants as compared to the sources that are identified by the inventors herein, and the volumes available for recovery are limited strictly to the USDA mandated 0.5 gallon per bird limitation. It is yet another object of the present invention to avoid the disadvantages associated with such prior art approaches.

SUMMARY

The various objects and aspects of the present invention are met using an approach which focuses on the source of the process water to be recovered and reused. This is in contrast to prior approaches which have focused upon the recovery and reuse of the "communal bath" chiller water. These conventional approaches commonly suffer from difficult treatment challenges and typically require fairly sophisticated treatment equipment components. As a result, these approaches have been accompanied by disadvantageously high capital and operating costs.

The inventive approach of the present invention comprises processes which allow for the safe and economic recovery, treatment and reuse of certain poultry processing water, specifically including the "carcass final rinse", "inside/outside carcass rinse", "water rails"or, water sprays used in the inspection process for the inspectors to wash their hands and instruments, flume transport of various animal parts and other smaller streams with respect to poultry processing operations while avoiding exclusive use of communal chiller bath water. In certain circumstances chiller bath overflow water may be used as one of the water sources if such chiller water can be sufficiently diluted with water from other sources. The intended points of re-use for this recovered and treated water have been identified as chiller bath water, evisceration wash water, defeathering water and other "non-product contact" processes. Additionally, in those plants where transport of process water is complicated due to plant layout and physical design an improved device is provided for effecting an economic and efficient recovery system comprising a recovery sump with a continuing overflow to permit removal of soiled water, grease and oils.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages may best be understood by reference to the following description, taken in connection with the accompanying drawings, in which:

DETAILED DESCRIPTION OF PREFERRED EMBODIMENTS

Figure 1:
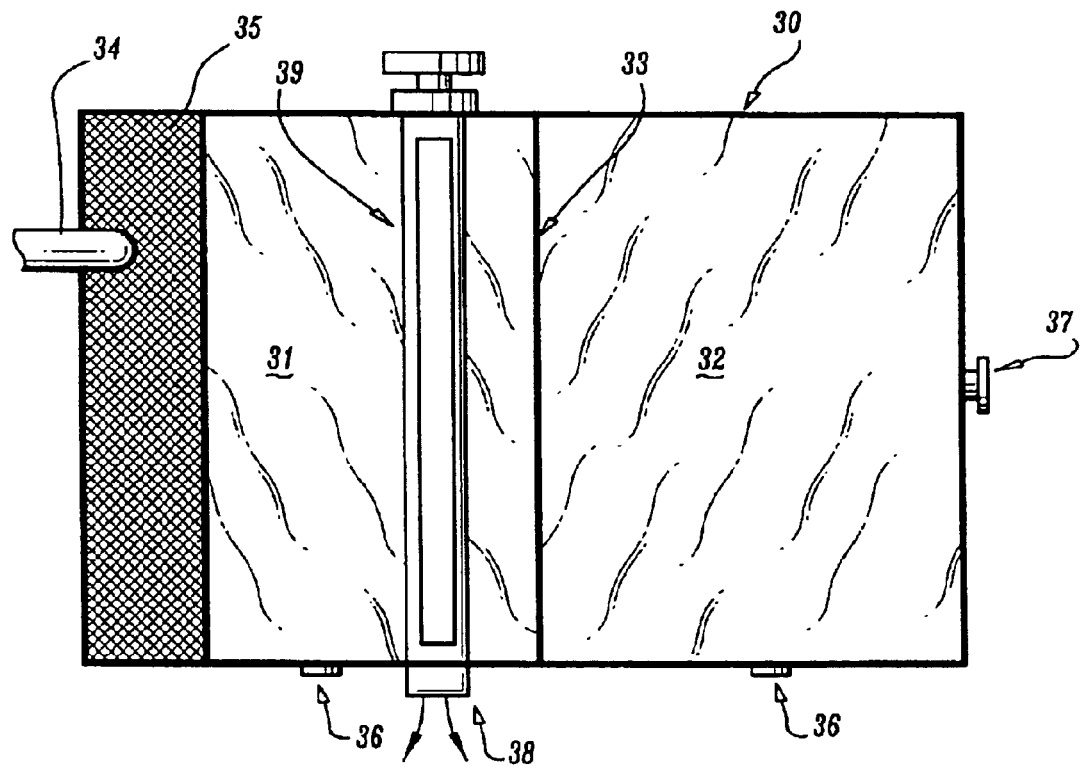
FIG. 1 is a top plan view illustrating a preferred recovery sump device.

The preferred embodiments of the apparatus and methods disclosed herein are discussed in terms of poultry processing water disinfection process. It is envisioned, however, that the disclosure is applicable to a wide variety of processes including, but, not limited to general carcass processing. The following discussion includes a description of the instrumentation for poultry processing and water disinfection followed by a description of the preferred processes associated therewith.

The present invention will benefit from the application of one or more devices which focus on the source(s) of the process water to be recovered and reused. There are several preferred methods employed in this invention to recover the desired source streams. Plant logistical layout and trench drain system locations as well as elevations determine the appropriate devices used for the capture and recovery of the source streams. In those plants where adequate trench drains at the appropriate elevations are not available the present invention will benefit from the use of a new recovery sump system. The recovery system contributes to the process efficiency and economics and it takes advantage of the physical characteristics of the waste stream to be recovered. Specifically, where possible, the recovery sump is designed to allow for a continuous overflow with a screening apparatus to remove, at the source, the greatest mass of floatable solid matter, fats, oils and greases. By implementing this recovery technique, downstream mass removal is advantageously mitigated and the organic loads presented to the floatation, filtration and disinfection/oxidation stages are reduced. This in turn allows for more efficient oxidizer usage and the demands of liquid/solid separation are lessened. In cases where the plant layout allows, the capture and recovery method is accomplished by custom designed collection devices located in close proximity to the source and connected by means of piping to a common collection header installed in the plant's existing trench drain system. Further details of the process water recovery sump and collection devices are provided below.

Mechanical Separation/Screening Device and Common Sump

The water collected from the desired source points flows and/or is pumped to the invention's second stage solids separation or screening device. The device consists of a rotary drum, self-cleaning type screening device where solids are captured on wedge wire or other suitable media and the water is allowed to pass through the screen's pours into a sump. The wedge wire mesh size may be varied to best suit the source stream. Additionally, the screening device may be configured in a double or triple drum configuration to allow for different sizes of mesh to sequentially remove solids. The screening device is also fitted with a high pressure, water spraying mechanism to allow for intermittent or, continuous washing of the screen mesh to prevent fouling due to buildup of solids and fats. In a preferred embodiment the screening device is configured as an internal loading screen where water is passed into the center of the drum and passes through a relatively larger mesh size followed by a smaller mesh size on the outer screen. This allows for different size solids to be removed in stages to prevent the fouling of the smaller mesh.

The screening device is driven by an electrical motor and may be fitted with variable speed drive to allow the operator to adjust the drum rotation speed for optimum performance. Varying the speed provides significant operating and performance enhancements by allowing the device to operate at the most efficient speed for washing off the solids. Further, the efficiency of the device can be improved by employment of a traveling spray nozzle. The traveling spray nozzle is installed on a bar fitted with limit switches to define and control the distance of travel of the spray nozzle. The spray nozzle can be driven back and forth across the travel bar by way of electric motor connected to a worm type gear or, by means of water pressure. The screening device is mounted on a sump for collection of the screened water. The sump is fitted with level sensors to control the rate of flow, retention time and any further designed overflow. The sump is also fitted with a dedicated pump to transport the screened water to the treatment system's downstream unit operations for further treatment.

Process Water Surge and Floatation Device

Following passage through the screening device and recovery sump(s), the recovered process water is then advantageously pumped to a device designed to remove remaining floatable solids. The configuration and specific mechanism of the floatation device may employ conventional "dissolved air floatation", "induced air floatation" or, a combination of these techniques for the gas assisted floatation of organic materials such as fat, oil, proteins, lipids, carbohydrates and small solid particles. The floatation vessel also serves to act as a volume-balancing device for hydraulic flows through the system's unit operations. The floatation device serves two distinct functions: 1) it allows for continuous operation of the overall process by containing sufficient volume of water for treatment and, 2) it acts as a floatation and removal basin for the floatable solids, fats, oils and greases. The floatation device is advantageously sized to act as a volume buffer and control to accommodate the variability in source water flows and to assist the entire invention to achieve its desired treatment process rate. This sizing is to allow for the interruption of influent water into the treatment system during any processing downtimes such as breaks for the workers and maintenance shutdowns of the lines. The floatation device is ideally fitted with an air injection system that utilizes compressed air and small bubble diffusion to provide for positive lift for the colloidal oils, grease, fats, undissolved animal matter and proteins present in the stream. The floatation device may also be enhanced by injection of gaseous ozone to promote flocculation of solids as is well known in the art. This flocculation induced by the reaction of ozone is well documented in the literature. The floatation device may also be fed with coagulants, polymers, metal salts or other chemical agents for the purpose of assisting or enhancing solids removal. In a preferred embodiment, the floated matter is removed from the tank by an overflow and skimming device. From there, the process water advantageously passes to the filtration modules which are selected on the basis of need.

Pre-filtration Module

In this invention depending on treatment needs, the effluent water from the floatation device will be further treated to remove the smaller solid materials remaining after screening and floatation by means of filtration, electrocoagulation, membrane separation or comparable technology. This module is ideally designed to achieve removal of fats, oils and greases, suspended solids and any inorganic debris. The design of the invention allows for single or multiple filter vessels or electrocoagulation reactors to be advantageously employed at this stage.

Additionally, either vacuum type diatomaceous filtration vessels or, pressure type diatomaceous filtration vessels may be used. The present invention also allows for maximum flexibility in the selection of specific grades of the filtration aid, such as diatomaceous earth where diatomaceous earth filtration is employed. In the case of membrane separation, the specific membranes may be sequentially configured to allow for a multiple pass type of separation. Or, in the case of electrocoagulation, reactor size and power input may be varied to provide the maximum efficiency for particle destabilization and separation.

Fine Filtration Module

Fine filtration of recovered process water is accomplished using diatomaceous earth which is precoated onto a matrix or septum. This fine filtration allows for removal of particulate matter, some adsorption of the fats, oils and greases and suspended solids. Thereafter the recovered process water is passed to the disinfection and oxidation module and then final polishing. The present invention flexibly allows for the use of single filtration or multiple vessels configured to operate in parallel. Fine filtration may also be configured to allow the use of membrane separation to achieve the desired final filtered water quality. Ideally, the effluent from the fine filtration vessel(s) is continuously monitored by on-line turbidimeters to assure that the target final quality is achieved. In a preferred embodiment, the turbidimeter(s) are interfaced with the main system control panel so that in the event the final water quality, from the fine filtration vessel(s) does not meet the designed standard, the entire system can be shutdown by way of a signal feedback loop.

Disinfection and Oxidation Module

The disinfection and oxidation module comprises ozone generation equipment, gas/liquid transfer and mixing devices and the ozone reactor assembly. These devices are conventional in design and commonly available. The ozonation process serves as the primary disinfection and color removal mechanism. The disinfection standard achieved in this module is continuously monitored by an Oxidation Reduction Potential (ORP) probe and conventional electronic voltage measuring devices. The disinfection standard may be predetermined by input of a specific setpoint (i.e., 750 millivolts—the International Bottled Water Association standard). Any deviation from the desired level of disinfection can be used to alarm, interlock or, alarm and interlock the entire treatment system. Injection of the gaseous ozone is designed to utilize the injection pump's pressure, combined with proper hydraulic pipe sizing to achieve sufficient pressure and flow to promote the maximum mass transfer of the ozone gas into aqueous solution. Either pipe reactor or, high efficiency, centrifugal gas/liquid mixing techniques may be employed. The ozonated water is then pumped to an ozone contact vessel to allow the ozone sufficient time to react with microorganisms to achieve the maximum disinfection standard. Excess ozone gas and unreacted ozone gas is removed by way of off-gas venting in the injection/contact loop. Any ozone off-gas may be reused in the system's floatation device.

Final Polish

The treated water may be advantageously polished after ozonation by means of a settling tank and/or passage through fine media or bag filter(s) or, activated carbon reactor. The need for final polishing will generally be dictated by the specific requirements imposed by the regulatory authorities.

Control and Automation

The process and equipment has the potential to self-regulate and self-monitor with little operator intervention. The use of a programmable logic controller provides the analog and digital input/output capability to continuously monitor and control the system, and to notify the operators of any system upsets and/or maintenance requirements. The process is ideally controlled via a control panel with illuminated displays showing all components operating conditions. The design of the main system control advantageously provides flexibility in choice of options to allow for varying degrees of automation and control sophistication.

Rechlorination

The treated recovered process water may be chlorinated prior to its introduction into the chiller bath or other designated reuse point. The chlorination of the treated water may be varied in specific dosage to allow for advantageous process application within the processing plant's operations. Again, the required levels of chlorination will generally be dictated by regulatory guidelines or the processors desired chlorine level for specific reuse point applications.

On-line Safety Assurance

The system is preferably fitted with a turbidimeter which permits instantaneous shut down of the process in the event of a rise in turbidity of the treated water beyond predetermined levels. This would permit the operator to take appropriate remedial action, analyze the water for the presence of pathogens or contaminants and assure that the quality of water introduced into the chiller bath, or other designated reuse points, meets appropriate "safe for the intended use" criteria.

On-line Backup

The process is advantageously fitted into the manufacturer's plant's operation with suitable float switches and valves allowing for the introduction of city water in the event that there are any process system malfunctions, upsets or power interruptions. This would then ensure that processing of the food product would not be interrupted by any recovery system upsets.

Advantages of the Water Recovery System

The processes of the present invention provide several significant and unexpected advantages over conventional treatment processes including improved food safety and improved process economics. The invention, in a preferred embodiment, is designed to operate in a cascade type flow where water is recovered "downstream" from evisceration and carcass washing operations and is treated and then reused in "upstream operations" such as scalding, picking, stunning and flume type operations. Additionally, the treated water may be reused in chiller makeup operations, sanitation wash and other approved reuse applications. Avoidance of closed loop applications of reuse water is seen as both desirous and prudent for a number of reasons: 1) due to the inorganic species found in poultry process water (i.e., specifically high phosphorous levels and calcium from the processor's water supply) the potential for unwanted precipitation of calcium phosphate or, other deposits on poultry product or plant equipment can be mitigated, 2) the inherent food safety advantages in "cascading" reuse water to points not used in recovery mitigates the potential for cross contamination, and 3) avoidance of cycling up or, concentration of unwanted organic compounds such as ammonia and other organic nitrogen compounds that could potentially have a negative impact on product contact or, non-product contact applications. In such situations, limiting the collected water for treatment to include ranges approximating from one (1) to about a ninety (90) percent chiller water is beneficial in order to prevent or limit the possibilities of contamination due to the above stated reasons. Further, limiting the collected water for treatment to approximately between twenty (20) and forty (40) percent has been found to be ideal, although higher percentages are clearly contemplated in this disclosure providing that the treated water meets the above stated criteria.

Similarly, once the collected water has been treated and reintroduced into the processing steps, it is preferable to limit reuse of the treated water into the chilling steps to approximately between twenty (20) and forty (40) percent of the treated water although varying percentages are hereby contemplated in the present disclosure.

By focusing on the recovery of the carcass final wash stream, inside/outside carcass wash cabinets or other relatively low load source streams, the process becomes inherently safer due to the fact that this stream is not the result of a communal bath for animal carcasses. This improved microbiological safety occurs because communal baths create a substantial potential for cross contamination. For example, the presence of one carcass containing pathogens in a communal bath creates the potential opportunity to spread the pathogens to other non-infected carcasses in the communal bath. In addition, adding the pathogenic load to recovered process water adds to the challenge of disinfection of the recovered water and raises the risk of reintroducing such pathogens-into other processing stages when the recovered process water is reused.

Accordingly, by avoiding exclusive reuse of the chiller bath water, using the process of the present invention, safety of the food product is enhanced because the water quality of the recovered carcass final rinse and other relatively low load source streams is significantly better than the quality of the water contained in the poultry chiller. This is in part due to the fact that the final wash water is in one-time contact with the final product and therefore has not had a long contact time with the food product to absorb into solution additional fats, oils and grease. Thus, by reusing downstream processing water and, more importantly, avoiding reuse of the upstream chiller water or water from an initial wash step, significant increased safety is imparted to the process.

Additional food safety benefits are offered by the invention due to the fact that advantageously dosed rechlorinated water is being returned to a number of "upstream operations" such as scalding, picking, stunning and flume type operations. In some cases the plant may not be regularly or adequately chlorinating the process water at these points of operation. The treated reuse water being directed to these reuse points is chlorinated at an advantageous dosage. It was surprisingly discovered that such advantageously dosed chlorinated reuse water is beneficial to the reduction in microorganisms on the carcasses being processed using said reuse water. In a preferred embodiment and as will be apparent from the embodiments disclosed herein, the reuse water is chlorinated with an advantageous dosage of chlorine or other approved disinfectant and is reintroduced "upstream" such as in the scalder or similar heating portion of the processing steps. During the scalding or heating processing steps, the pores and tissue membranes of the carcasses are open and are more readily receiving of the surrounding water, i.e., the reintroduced chlorinated water. The reintroduction of the chlorinated reuse water into the scalder or similar heating processing step causes a dramatic reduction in the levels of microorganisms associated with the carcasses that has not been found in the prior art.

Additionally, by avoiding exclusive reuse of the chiller bath water, the relative economics become significantly more favorable to the end user due to the fact that later streams such as the final carcass stream contain significantly less contamination mass. Because the economics of treatment are largely dependent upon the mass of compounds to be removed, by significantly diluting any chiller water with water from other sources or by eliminating chiller water entirely, the contaminated load on the purification process is significantly lessened and with it the concomitant cost.

Recovery Sump

The present invention also provides a new methodology developed to recover poultry wash water from various stages of the product processing operations where water is captured from the wash or rinse cabinet(s). Such techniques are optionally employed in integrated water treatment systems directed at maximum recovery, treatment and reuse of such process water, such as that described herein. Such techniques are best employed in those plants where plant logistics are complex and plant trench drain systems are not available.

The device of the present invention allows for maximum removal of solid matter, floatable fats, oils, and grease, animal parts including skin, small body parts and detritus. The early removal of these constituents at or close to the source of the water from wash or rinse cabinets provides far greater efficiency and reduces significantly the complexity of treatment components in the later treatment stages of the integrated water recovery process. It was surprisingly discovered that by removing a greater mass of constituents at, or close to the recovery source, a greater impact on downstream water treatment economics was obtained.

A preferred embodiment is capable of collecting water from a typical poultry slaughter line wash station. A primary function of this apparatus is to provide a collection basin for the wastewater from the carcass wash cabinets and other source points. A secondary function of the apparatus is to provide for a hydraulic design that allows a continuous skimming of the floatable solids, fats, oils and grease that are the typical contaminants found in such waste streams. The apparatus also serves as the point where the water, after solids removal, is transferred from the processing floor to a treatment system located outside the processing facility for further treatment.

Figure 2:
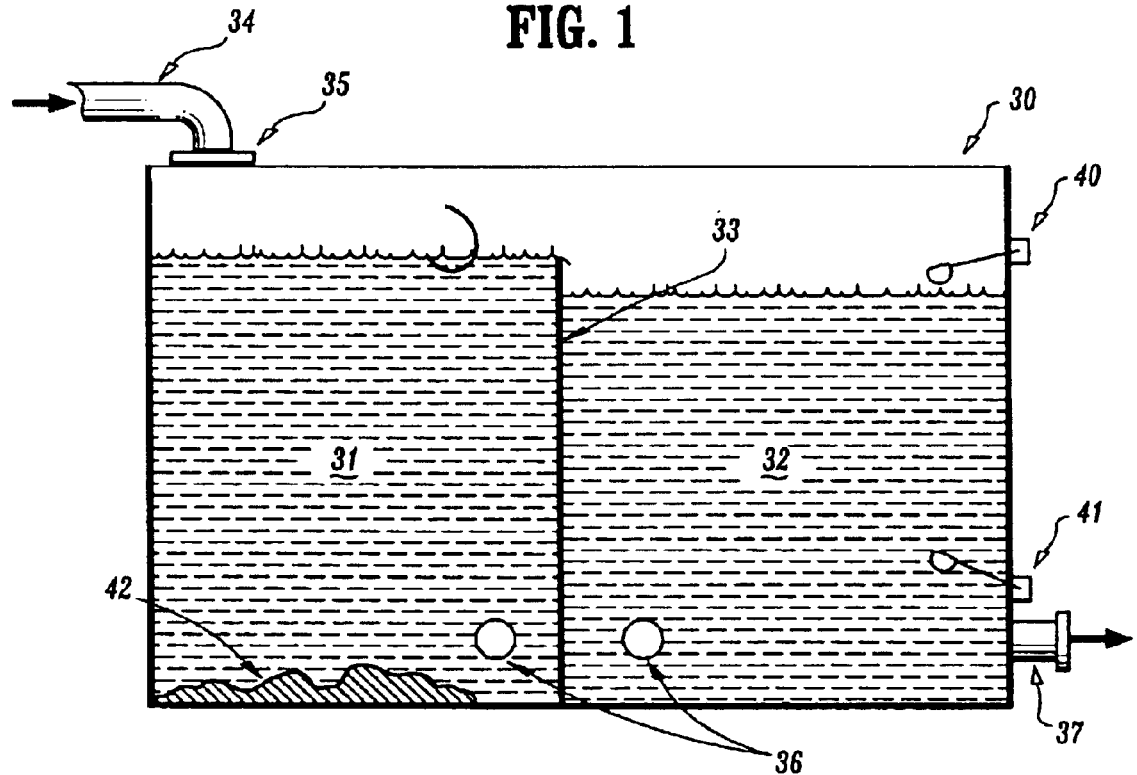
FIG. 2 is a view illustrating a cross-sectional view of the preferred recovery sump device of FIG. 1.

In a preferred embodiment and with general reference to FIGS. 1 and 2, the ideal device comprises a specially designed stainless steel sump containing floatation chambers, weirs, screens and clarified water flow channels. While the exact dimensions of this device can be advantageously varied from application to application, all such devices would ideally include most, if not all, of the following features: a main sump vessel, a screened top, overflow ports, weirs and slant plates, a deep sump, float sensors and a system transfer pump.

The apparatus comprises a rectangular, welded basin 30 of a size and volume to permit proper hydraulic flow and overflow for the specific waste streams to be collected and transferred. The basin 30 is fitted with configured baffles 33 to separate the turbulent flow section 31 (associated with waste stream collection) from the relatively quiescent portion 32 from which the water may be pumped for further treatment. The number and configuration of the baffles is application specific and, to a large extent, will depend upon the volume of water to be collected and transferred.

The apparatus is also fitted with a skimming device 39 consisting of a "half-shell" stainless steel tube or weir pipe. The tube skimmer 39 is adjustable in its vertical orientation to allow for fine-tuning to the specific application intended. The number and location of these skimming tubes will also depend upon the volume of water and flow velocity for a specific application. The end of the weir pipe 38 communicates with a drain allowing removal of skimmed solids. The apparatus is also advantageously fitted with a mesh screen 35 located at inlet 34 to prevent the entry of large solids (animal parts, skin and other gross solid matter) from fouling or clogging the collection sump and attached piping.

To facilitate operation of the apparatus as an integral part of a wastewater treatment system, the device is also fitted with level sensors 40 and 41 to actuate the attached transfer pump (not shown) only when the desired water level is reached. The sensors also shut down the pump when the water level has fallen below the "low level" setting to prevent the pump from dry cycling which may cause damage to the motor and other components. The device is fitted with outlet fitting 37 to which the pump suction is attached to enable transfer of the collected, treated water and drain plugs 36 to allow for ease of cleaning during the plant's sanitation procedure and removal of collected solids 42. The materials of construction of basin 30 are ideally stainless steel in order to conform to the USDA criteria for food processing equipment.

Operation of the Water Recovery System

Figure 3:
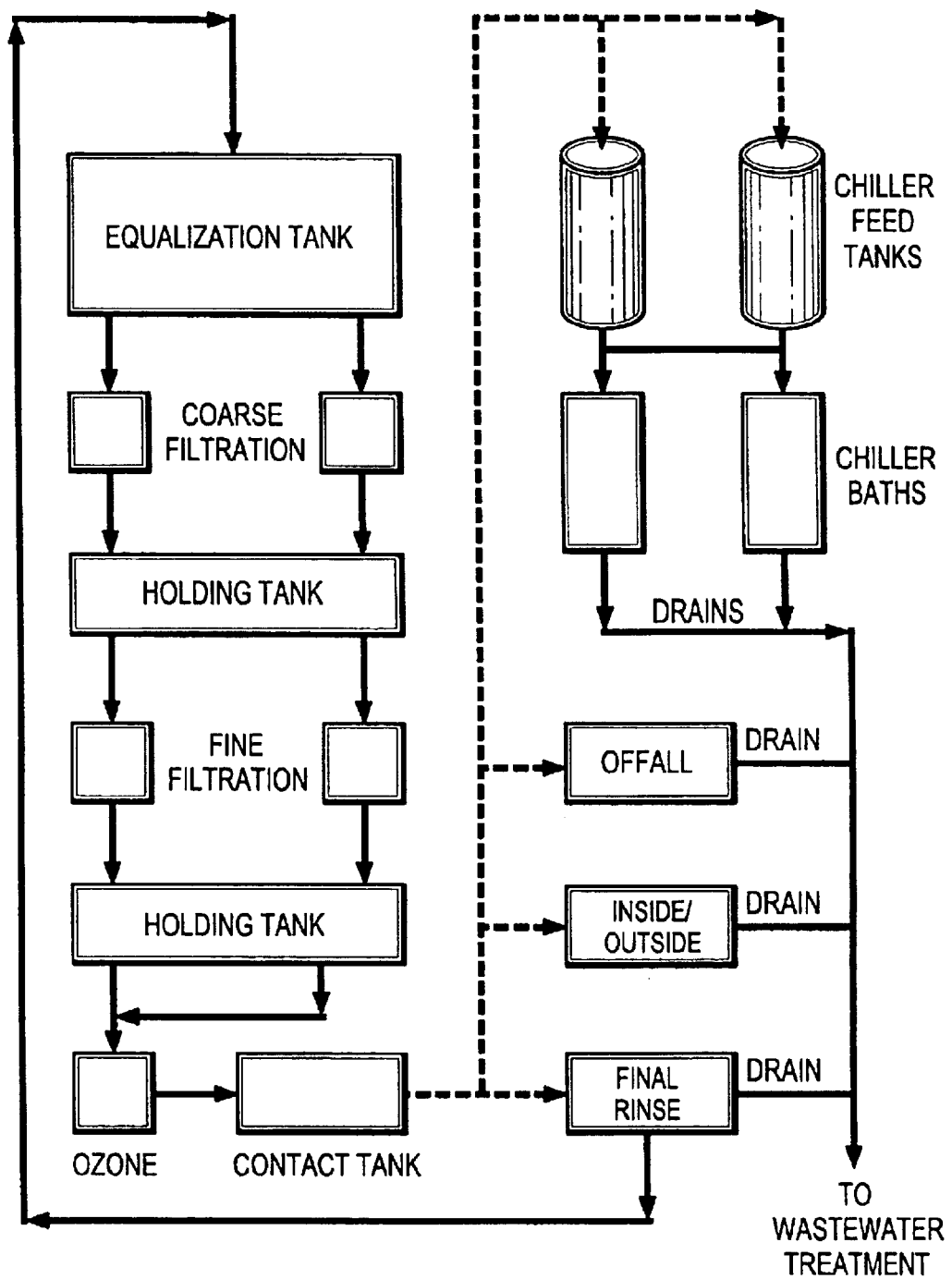
FIG. 3 provides an overall flow chart of a preferred embodiment of the water recovery system.
Figure 4:
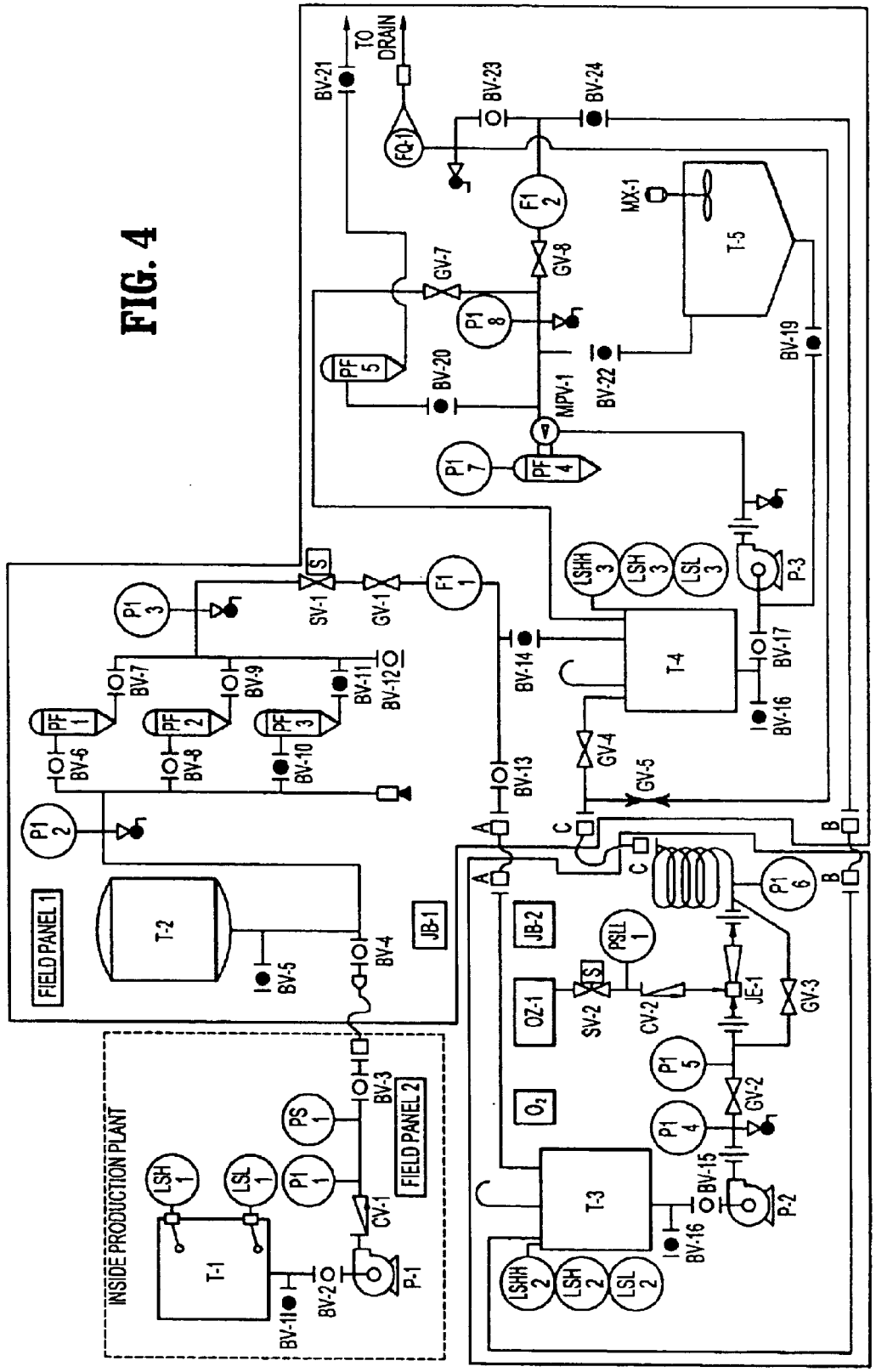
FIG. 4 provides a detailed operative engaging flow plan of another preferred embodiment.
Figure 5:
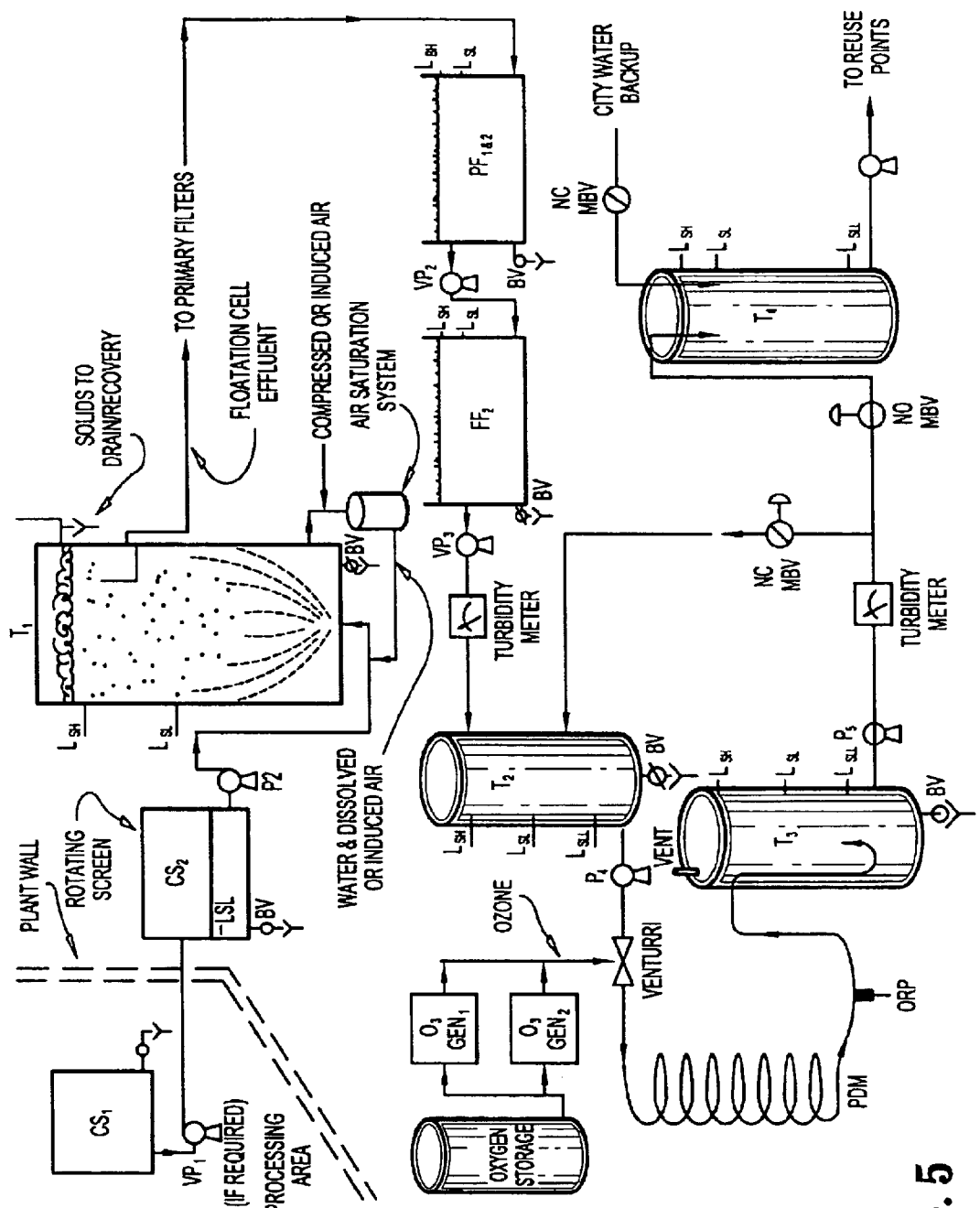
FIG. 5 provides a flow chart of a preferred embodiment of the water recovery system according to the present disclosure.

With reference to FIGS. 3–5, the treatment process is designed to deliver a final quality of water that is safe for intended use as carcass or bird chiller makeup water, evisceration wash water, inside/outside wash water, sanitation cleanup water or use at any other point requiring a high quality, pathogen free, chlorinated wash or rinse water source. The present invention capitalizes on the discovery that the carcass washing in inside/outside carcass wash cabinets, "water rails", organ or paw transport flumes and final rinse stages represent the cleanest sources of potential reuse water available in high volume and that the treated water from the proposed treatment system will deliver water meeting the following quality standards:

1. Absence of pathogens (*E-Coli,* Fecal Coliform, Aerobic Bacteria, Salmonella).
2. Turbidity no greater than 5 NTU's.
3. Treated water is safe for the intended use.

In cases where the plant layout allows, the preferred method for capture and recovery of source water is accomplished by custom designed collection devices located in close proximity to the source and connected by means of piping to a common collection header installed in the plant's existing trench drain system. In cases where this is not possible, the recovery sump device (to be described later herein) is used as the initial collection point for source water.

The recovery sump device is ideally located under or adjacent to the poultry planes wash or rinse cabinets and is situated such that the wash or rinse water, after being sprayed (using typical spray nozzles) onto the animal carcass, is captured in the main sump. This water contains at this stage, high levels of solid materials including fat, skin, small animal parts, oils and grease as well as other organic and inorganic materials (contaminants) being washed off the carcass. The contaminant laden water then flows over and through the screened main sump top where gross solids are captured and allowed, by way of the angle of orientation, to be continuously washed off the recovery sump device into the plant's wastewater trough or piping. The water is then permitted to gravity flow over the recovery sump weirs which are fitted with channeling devices to promote the removal of "floatable" contaminants. Again, these contaminants are ideally removed from the device and flushed into the plant's wastewater drain system.

The ideal device preferably contains float sensors; low level and high level, to activate the devices transfer pump. The level of water contained in the device will dictate when the device is in overflow mode. Overflow mode is the level where water containing the "floatable" contaminants is higher than the sump's overflow ports, which are sized to allow for large pieces of material to be efficiently floated out of the system. The overflow level also ensures that the water in the device has had sufficient residence time to allow for floatation of the "floatable" contaminants to reach the surface of the water. The device activates the transfer pump when the high level sensor indicates that the overflow mode has been achieved. The actual settings of these sensors are advantageously calibrated during installation of the device to allow for application specific conditions. The water captured in the device is flowed (by gravity) through a series of different vertical height weirs which act as the traps for solid, floatable contaminants. These weirs have flow channels in the bottom which allow for "clarified water" to flow. Each section of the device is designed to remove successively smaller (in mass) contaminant particles.

The collected water is then pumped by way of a vacuum type, pump(s) to the treatment system's common collection and rotary screening device for additional solids separation and removal ideally located outside of the main plant. The main influent/floatation tank ideally is fitted with dissolved air floatation or, induced air floatation which utilizes compressed air introduced into the floatation chamber by gas/liquid injection device(s) to promote flotation of suspended solid material (largely fats, oils, grease and animal matter). The skimmed product may be captured and recovered for rendering. This tank serves as the main reservoir and surge tank allowing for smoothing of volumetric flows during the plant's operations.

The treatment system comprises five major component arrays including source point collection/solid separation, primary screening, floatation/aeration, primary filtration, fine filtration and disinfection. The primary filtration module is comprised of either vacuum type, diatomaceous earth filtration vessel(s), electrocoagulation reactor(s) or membrane separation modules. The media used in these vessels can be standard, commercial grade diatomaceous earth, which is ideally "precoated" onto the vessel's stainless steel matrix septum. The water is filtered to remove-further organic content including fats, oils and grease. The primary filtration module can be recirculated at a higher rate than the process throughout to allow for multiple pass type filtration. The primary filtration modules can be operated in parallel or sequentially to promote maximum removal of solids, fats, oils and grease. This module can be configured with redundant (backup) module(s) that are ideally controlled by the systems main control panel. Such that, when the pressure differential exceeds the design parameters programmed into the control panel's programmable logic controller, an alarm is activated to notify the operator that the filtration module is approaching a fully loaded stage. The alarm will not shut down the system unless the on-line turbidimeter reaches a predetermined high level. The on-line turbidimeter can perform either system shutdown or, activation of a motorized ball valve to shunt the flow to the standby filtration module. The water from the primary filter module is then pumped to an intermediate tank (for example, 3000 gallons) where settling and equalization is accomplished and this tank serves as a smoothing station for the system to allow for a continuous, batch type operation.

Filtered water from the first intermediate-tank or alternately from the primary filtration module is pumped to the final polishing module by way of a centrifugal, end suction, top discharge type pump. The final filtration module comprises a vacuum type, diatomaceous earth filtration vessel and is precoated with a blend of standard commercial grade diatomaceous earth and an absorbent, cellulose type media. Alternative devices such as membrane separation devices or multi-media filtration modules may be employed where water quality dictates their efficacy. The final polishing module is advantageously fitted with a Hach (or equivalent) on-line turbidimeter to continuously monitor the turbidity of the filtered water. These filters are designed to remove further organic material, fats, oils and grease. This module can be fitted with a backup module to allow for "hot" switching in the event that the pressure differential exceeds the programmed high level. The pressure/vacuum differential is monitored and will activate an alarm condition at a predetermined set point. Again, this alarm will not shut down the system unless other parameters are exceeded. The alarm is to notify the operator that the filters are reaching the loaded stage. Most preferably the final filtered water then enters a second intermediate tank, which serves as an equalization tank and settling basin, however, this step may be optionally eliminated.

The filtered water is then pumped by a centrifugal, end suction, top discharge pump to the disinfection system. Disinfection is accomplished by the introduction of gaseous ozone into the filtered water. Ozone is generated by a corona discharge type ozone machine using cryogenic oxygen or, oxygen separated by pressure swing adsorption on-site as the parent gas. The ozone is preferably introduced into the filtered water by way of a venturi type gas/liquid mixing device (Mazzei Injector). The ozonated water is pumped through a pressure dwell manifold or a high efficiency, centrifugal gas/liquid mixing device to promote maximum dissolution of the ozone gas. The ozonated water flows to an ozone contact tank (304 stainless steel) ideally sized to achieve a minimum of about 7 to 10 minutes contact time. Ozone generator sizing has been based on U.S. EPA criteria for 3 to 4 log removal efficiency at an applied dose of a maximum of 7 ppm and a standard of 5 ppm. The ozone contact tank is fitted with either a dissolved ozone measuring device or, an Oxidation-Reduction Potential (ORP) probe. This probe is interfaced with the dissolved ozone monitor or, ORP monitor in the system's main control panel and dissolved ozone level or, ORP is constantly displayed on the panel front. ORP and/or dissolved ozone is ideally controlled to achieve the desired disinfection standard determined by microbiological analysis at various dissolved ozone or, ORP set points to assure that the water is pathogen free. A 750-mv ORP set point is commonly used to indicate the sterility of water. The International Bottled Water Association (IBWA) and others state that, at this level of oxidation, the water is deemed sterile by drinking water standards and that microbiological activity is eliminated. An alarm is activated if dissolved ozone level or, ORP falls below the programmed setpoint and the system can be shut down.

The treated effluent from the system will then be advantageously piped to the plant's bird chiller storage tanks for use as bird chiller makeup or to additional reuse points including but not limited to the scalder, evisceration wash water, defeathering wash water, inside-outside carcass wash, and sanitation cleanup water to allow maximum volumetric reuse.

Control of the treatment system's operations is preferably accomplished by way of a Programmable Logic Controller (PLC). The Main Control Panel continuously monitors the treatment system's operations and performance using digital and analog inputs designed to monitor total volumetric flow (pulse type, digital flowmeter with totalizer), pressure differential sensors fitted to both primary filtration modules and final filtration modules, turbidity at effluent of primary filtration and at effluent of the ozone contact tank. An ambient ozone monitor is also preferably installed adjacent to the plant's bird chillers, or other acceptable reuse points, to continuously monitor ozone levels. All controls and safety devices are ideally interfaced with the main operating control panel and designed to notify the plant operator in the event of any system upset and interlock the system in the event that the final water quality fails to meet the standards established above.

Additional Reuse Water Quality Assurance & Safety Considerations

With particular reference to FIGS. 4 and 5, the treatment system is fitted with various monitoring and safety devices such as a solenoid shut-off valve fitted at the reuse water fill line to the bird chiller water storage tank. The solenoid valve is activated to close in the event that the water quality standard, ideally 5 NTU's Turbidity, is not met. The bird chiller water storage tank and/or the treatment system's final product storage tank is also fitted with a backflow prevention valve on the city water inlet pipe to prevent backflow of the treated reuse water into the main city water line. Secondly, each filtration module is fitted with pressure/vacuum differential sensors to continuously monitor the performance of filtration. Alarm indicator lights are fitted to the systems remote monitoring panel to enunciate alarm status when pressure/ vacuum differential readings are out of the prescribed ranges, when turbidity of primary filtration is out of range and for effluent turbidity in NTU's. The treatment system continuously monitors turbidity at the discharge to the bird chiller storage tanks or other designated reuse points and is interfaced with the main system control panel to shut down the system in the event the final quality exceeds 5

NTU's at which time, water from the treatment system can be recirculated within the treatment system or, diverted to the plant's main wastewater drain.

The key to FIG. 4, which depicts a conventional engineering flow chart of a preferred treatment process is:

| ID LABEL | DESCRIPTION |
| --- | --- |
| F1-1 & F1-2 | Flow Indicator |
| FQ-1 | Flow Totalizer |
| JE-1 | Jet Inductor |
| LSH-1 | Level Switch High |
| LSL-1 | Level Switch Low |
| LSHH-2 & LSHH-3 | Level Switch Hi–Hi |
| LSH-2 & LSH-3 | Level Switch High |
| LSL-2 & LSL-3 | Level Switch Low |
| MX-1 | Mixer |
| OZ-1 | Ozone Generator |
| P-1 thru P-3 | Centrifugal Pump |
| PF-1 & PF-2 | Particulate Filter |
| PF-3 | Particulate Filter |
| PF-4 | Particulate Filter |
| PF-5 | Particulate Filter |
| PI-1 thru PI-8 | Pressure Indicator |
| SV-1 | Solenoid Valve |
| SV-2 | Solenoid Valve |
| T-1 | Collection Tank |
| T-2 | Pressurized Tank |
| T-3 & T-4 | Surge Tank |
| T-5 | Slurry Tank |
| BV-# (black circle) | Motorized Ball Valve-normally closed |
| BV-# (open circle) | Motorized Ball Valve-normally open |

The valves aare ideally controlled through the programmaable processor control based on readings obtained from monitoring sensors and level switches. Control is designed to ensure adequate supplies of water at each stage of the system and that turbidity, NTU and microbiological load requirements are continuously met.

FIG. 5 depicts a flow chart of a preferred embodiment of the treatment process. In addition, FIG. 5, in comparison to the process shown in FIG. 2, demonstrates the advantageous flexibility inherent in the treatment and recovery process of the invention and the ability to use defferent components at certain stages of the process to accomplish desired goals. Still other substitutions can be made, such as using electrocoagulation to accomplish the filtration effected by diatomaceous earth filters.

| ID LABEL | DESCRIPTION |
| --- | --- |
| P | Pump |
| CS | Collection Sump |
| VP | Vacuum Pump |
| T | Tank |
| LSL | Level Sensor Low |
| LSH | Level Sensor High |
| PF | Pre-Filter (diatomaceous earth) |
| MBV | Motorized Ball Valve |
| FF (1 & 2) | Final Filter |
| FF (3 & 4) | On-line Standby Final Filters Added as Needed |
| PDM | Pressure Dwell Manifold |
| O3 Gen (1 & 2) | Ozone Generators |
| BV | Ball Valve |
| LSLL | Level Sensor Low–Low |
| NC | Normally Closed |
| NO | Normally Open |

Additionally, the ozone disinfection module is continuously monitored using an Oxidation Reduction Potential (ORP) or, Dissolved Ozone ($DO_3$) probe and monitor. A low ORP or ($DO_3$) alarm is enunciated on the remote monitoring panel to indicate system fault should the ORP/$DO_3$ fall below the site-specific ORP/$DO_3$ level. The ORP/$DO_3$ monitor and controller will immediately shut down the system in the event that ORP/$DO_3$ falls below site specific low level ORP/$DO_3$ reading and the system will be placed in alarm shutdown mode. Further, an ambient Ozone Monitor is installed adjacent to the two bird chiller baths, or other acceptable reuse points, within the plant to continuously monitor ozone levels. The Ozone Monitor will announce ambient levels above 0.06 ppm and activate system shutdown at a level exceeding 0.08 ppm to assure compliance with OSHA standards. Also, the treated reuse water entering the facility shall be free from ozone residual to prevent contact of product with a non-approved substance. This may be advantageously accomplished by providing sufficient residence time in transit to and storage in the treatment system's final storage tanks to allow for complete dissipation of ozone. Alternative techniques employing ultraviolet radiation or, activated carbon adsorption may be used where final ozone concentrations are detected to be high. In this regard, it is useful to note the half-life of ozone is approximately 5–15 minutes in aqueous solution.

The treatment system according to the present disclosure is designed to be operated continuously during the plant's processing operations and the system is ideally designed to undergo sanitation during the plant's sanitation shift. To ensure integrity of the system, all piping from the system's collection devices will be labeled clearly as "REUSE WATER" for ease of identification, and all materials of construction and media coming in contact with the recovered water have been selected to comply with FSIS Food Safety Standards. With the exception of the system's recovery and collection devices and in-plant piping to the treatment system, components are advantageously located outside of the processing facility.

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto.

What is claimed is:

1. In a method for processing poultry comprising the steps of washing said poultry with wash water, rinsing said washed poultry with rinse water and chilling said poultry with chilled water, the improvement comprising the steps of:

recovering at least a portion of said rinse water;

separating solids from said portion of said rinse water;

treating said portion of said rinse water with ozone;

treating said portion of said rinse water ozone;

chlorinating said portion of said rinse water; and reusing said treated portion of said rinse water in said steps of washing said poultry with wash water and chilling step said poultry with chilled water.

2. The method according to claim 1 wherein said step of recovering is performed by passing said portion of said water through a recovery sump comprising a basin having a first compartment for receiving said recovered water and barrier in said basin forming a second compartment, said first compartment having at least one pipe for skimming solids from said recovered water leaving skimmed water which, when said skimmed water reaches a level higher than said barrier, flows into said second compartment, and wherein said second compartment includes an exit orifice in fluid communication therewith for allowing said skimmed water to exit said basin for further processing.

3. A method for processing animal food stuffs which processing includes an initially washing and rinsing step with water and subsequent chilling step with water, said method comprising:

recovering at least a portion of said water from any processing step, except said chilling step;

treating said recovered water to meet regulatory requirements said step of treating includes passing said recovered water through a recovery sump comprising a basin having a first compartment for receiving said recovered water and barrier in said basin forming a second compartment, said first compartment having at least one weir pipe for skimming solids from the surface of said recovered water leaving skimmed water which, when said skimmed water reaches a level higher than said barrier, flows into said second compartment, and wherein said second compartment has an exit orifice in fluid communication therewith for allowing said skimmed water to exit said basin for further processing;

reusing said treated water in at least one processing step.

4. A method for recycling water used in poultry processing comprising the steps of:

recovering water used in a downstream poultry processing step through a recovery sump comprising basin means for receiving said recovered water wherein said downstream processing step is downstream from evisceration;

skimming solids from said water;

reducing impurities in said recovered water using means for treating water to reduce impurities and provide disinfection; and reusing said water in at least one step of said poultry processing.

5. A method for recycling water used in processing poultry for sanitization that employs downstream processing steps and upstream processing steps, comprising the steps of:

recovering a portion of water used from at least one of said downstream processing steps, wherein no more than approximately 40 percent of said portion of water originates from a chiller tank wherein said downstream processing step is downstream from evisceration;

treating said portion of water chemically to reduce impurities and provide disinfection, said chemical treatment being selected from the group consisting of ozone and chlorine;

polishing said portion of water via a fine media; and reusing said treated portion of water at least one of said upstream processing steps.

6. A method according to claim 5 wherein said step of recovering includes no water from a chilling processing step of said steps of processing poultry.

7. A method according to claim 5 wherein said step of reusing said treated water includes no more than approximately 40 percent of said treated water is reused in said chilling tank.

8. A method of processing poultry including a plurality of steps for sanitizing said poultry, the method comprising the steps of:

recovering water used in at least one of said plurality of steps for sanitizing said poultry;

treating said water to reduce microorganisms on the surface of said poultry by ozonating and chlorinating said water; and re-introducing said treated water into any of said at least one said plurality of steps for sanitizing said poultry and said introduction reduces the level of microorganisms within said poultry.

9. The method of processing poultry according to claim 8, wherein said step of introducing said treated water into any of said at least one said plurality of steps for sanitizing includes a scalder or heating processing step.

10. The method of processing poultry according to claim 8, wherein said step of introducing said treated water into any of said at least one said plurality of steps for sanitizing includes introduction of said treated water into the pores and membranes of said poultry.

* * * * *